Patented Apr. 23, 1929.

1,710,076

UNITED STATES PATENT OFFICE.

EUGENE R. SCHLATTER, OF LITTLE FALLS, NEW JERSEY, ASSIGNOR TO DIP-IT INC., OF NEW YORK, N. Y., A CORPORATION OF NEW YORK.

DYESTUFFS AND COLORING COMPOSITION.

No Drawing.   Application filed May 7, 1925. Serial No. 28,731.

This invention relates to certain improvements in dyestuffs and mixtures thereof in solution, and particularly in that class of such products which are intended for dispensing to, and to be used by, the laity, or those not skilled in the technique of the use of dyes for coloring or tinting fabrics.

In the manufacture of dyes in a commercial way, it is practically impossible to produce dyestuffs, especially of the class known as "coal-tar dyes," so that they will always produce exactly the same shades of color on the fabric.

In fact dyeing establishments find it necessary to employ experts skilled in the art to match the colors purchased from the manufacturers by adding dyestuffs of other shades and colors in varying amounts, in order to make the products of differing batches of equal coloring value.

It is important for the user of dyes, in the coloring of fabrics, to have for use always dependably matched dyestuffs, so that the results obtained may be uniform in their action upon the fabrics to be dyed, and it has been a matter of frequent occurrence that dyers had incurred considerable losses because the dyes which they used had not been properly matched with batches previously used for the same purpose.

In the class of dyes which are usually dispensed for household uses it is also important that the dyes be not only of uniform color, but they must also be considerably reduced in strength, because, as they come from the dye manufacturer, they are entirely too concentrated.

In the dye-baths some colors are used in dilutions of 1:25,000 and even as high as 1:300,000, and in mixtures such varying amounts must be used to get proportionate quantities into solution for the production of particular and dependably uniform tints and shades, that the dyestuffs and mixtures cannot be used directly by the laity, and especially not on the very small scale on which the domestic dyeing operations are conducted. The preparation of mixtures of various colors to produce many novel and attractive shades or tints on such a scale is entirely out of question, as such mixtures frequently involve, for the best results, the combination of the coloring effect of acid, basic, and substantive dyes. My invention relates more particularly to the preparation and use of such varied mixtures in glycerin, as will be set forth in greater detail below.

Various expedients have been resorted to in the production of complete lines of dyes for household purposes to reduce them to proper strength and shade, with the aim to make them suitable for convenient and purposeful use.

For instance, dyes have been mixed with hard soaps, intended to be dissolved in water prior to use or to be rubbed on the fabric. It has been found, in practical application, to be very difficult to incorporate the dyes with the soap uniformly, and such dye soaps have therefore shown a tendency to streak the fabrics, for the dyeing of which they were used. Then again dyes have been mixed with various proportions of salts, such as, for instance, sodium sulphate, sodium chloride, or the like. It was found that by such means concentrated dyestuffs may be sufficiently diluted for all practical purposes, but often these salts have the effect of precipitating the dyes when placed in solution, thereby preventing them, to a large extent, from attacking the fibre. In fact, mineral salts of this character have been in common use for the very purpose, through their precipitating action, of fixing dyes upon the fibre of the fabric after the dyes have already been applied.

Dyes also have been prepared in the form of solutions, i. e., in water, alcohol, liquid soap, etc., but the general utility of such preparations for stock solutions or presolution has been limited, and were not suited to serve every required purpose, and for a number of reasons and for special purposes were even objectionable.

Glycerin has also been used occasionally in connection with dye-stuffs, but only for very special purposes, as in the manufacture of liquid bluing and inks for stamp pads, typewriter ribbons, and the like.

But not until quite recently have the special properties of glycerin as a dye solvent been discovered and applied in a practical commercial way in the inventions of Albert David, and with which I am familiar, and I have now discovered other special applications of glycerin in its relation to dyes, as will be seen from my further detailed descriptions to follow.

A complete line of household dyes for the purposes stated that would answer every requirement for such use has not, until quite recently, been offered to the public. The essential requirements for such a line of dyestuffs are that the products should be convenient to dispense in small but definite quantities; they should be uniform as to shade and strength; they should be simple in application, and should preferably not require any boiling of the fabric in the dye solution; they should not cause specking or streaking of the fabric; and they should produce a satisfactory result, giving brilliant and uniform colors.

In order to produce such a line of products satisfactory in every respect for the purposes stated, and which would include a great variety of dyes and shades of colors and that would be uniformly soluble in water for the preparation of the extemporaneous dye bath by the housewife, I have produced such products by combining various coal-tar dyes in solutions which could be serviceably dispensed to the public and which would give any desired dye effect on cotton, silk, and wool.

My present invention is an improvement and further development of the products and processes which are the subject of several pending applications of Albert David, to wit, Serial Nos. 471,438, 546,799, and 546,800.

By making up these solutions in sufficiently large quantities I can always easily match them up to certain selected standards so that the finished product could be used by any, even inexperienced, person, to produce always substantially the same results.

In the manufacture of such coloring materials of proper shade and intensity, I have found it necessary to select the proper proportions of fundamental dye material, and in doing this have frequently found it necessary, in order to get desirable and attractive colors and shades thereof, to use such dyestuffs of diverse chemical types having different chemical properties, which are chemically incompatible with each other when used together in aqueous or other solutions. For instance, as will be more fully set forth in greater detail later on, it may be desirable to mix in various proportions various substantive, acid, and basic dyes. As is well known, when such mixtures of different classes of dyes are dissolved in water, there frequently will result a chemical interaction. Some of the dye material is thereby eliminated and the dyeing power considerably reduced, and this circumstance has heretofore prevented dyers from using acid, basic, and substantive dyes promiscuously, and thus limited to a considerable degree the choice of dyestuffs for making combinations to produce varieties of colors and shades as desired and suitable for dyeing different kinds of fabrics indiscriminately and generally without boiling.

The problem to be solved was to find a suitable dispensing medium in which such dyes of various characteristics could be dispensed, so that, when the same was used for the purpose of preparing dye batches, the several dyes contained in the mixture would remain thoroughly dissolved, and not be precipitated, so as to avoid the specking and streaking of the fabrics and insure full utilization of the dyes employed.

Some special properties of glycerin as a presolvent for dyes had already been disclosed by David (supra) and applied by him for making some coal-tar dye-solutions in glycerin.

It is true that glycerin, as stated, has been known before as a solvent of certain dyes, and it is being, or has been, used as a solvent in the preparation of dye solutions or pastes for stamp pads, and also as a hygroscopic agent in soft soap solutions of various dyes to prevent caking, but it has never been realized how universal is its power for dissolving practically all organic dye-stuffs, whether basic, acid, or substantive. As a matter of fact it really is a more universal solvent of such dyes than is either water or alcohol. It is interesting to note that Schulz, in his well-known tables on dyestuffs, does not mention glycerin as a solvent, clearly indicating the very limited uses to which glycerin has hitherto been applied in connection with these organic dyestuffs.

I have been working with glycerin in the preparation of presolutions for sale to the laity to be used for the preparation of extemporaneous dye-baths for household uses, and have now found that glycerin has further special properties with respect to the solubility of coal-tar dyestuffs which had not theretofore been known.

So far as the authorities reveal, it has not been previously known that many dyes which per se are not soluble in alcohol, for instance, become soluble therein if they are first predissolved in glycerin.

This is a striking point rather important in the technique of dyeing in alcoholic dye-baths for the purpose of preventing shrinkage of the fabrics and eliminating the necessity of subsequent ironing of delicate articles like laces, curtains, etc. Diamine fast yellow, for instance, is a coal-tar dye which is practically insoluble in alcohol and which cannot be dissolved therein in sufficient quantities to dye any fabric satisfactorily. However, when this diamine fast yellow dye is previously dissolved in glycerin, various amounts of the solution may be added to alcohol to produce dye-baths of any desired strength, which then may be purposefully used for dyeing delicate articles as previously explained. It may be thought that a proportional mixture of alcohol and glycerin would have a similar dissolving effect on the dyestuff, but I convinced myself through experiments that this is not so and that I can produce such an alcoholic dye-bath only by first dissolving the dye-stuff in glycerin. I took, for instance, 5 cc. of a 2% solution of diamine fast yellow in glycerin, added it to 200 cc. of alcohol, and produced thereby a dye-bath of considerable strength. I then took a mixture of 5 cc. glycerin and 200 cc. of alcohol and tried to dissolve in this the equivalent of diamine fast yellow, i. e., 0.1 gram, but practically no dyestuff went in solution, not even on longer standing and moderate heating. The coloring effect on silk was practically nil, while the former dye-bath produced a beautifully deep yellow shade on silk. The practical application of this discovery, I intend to make the subject of a separate application for U. S. Letters Patent, and cite this example of the special properties of glycerin here merely by way of illustration.

Owing to these special properties of glycerin as a solvent for dyes and mixtures of dyes of different classes, I have no difficulty in producing a large number of dye mixtures suitable for many purposes (not previously attainable by the old known means) by mixing various colors of whatever character, acid, basic, or substantive, and preparing a solution of them in glycerin so that such solutions will then be suitable for the purpose of tinting and dyeing indiscriminately cotton, silk, and wool, and generally without the necessity of heating the dye-bath, all of which greatly simplifies the application of my invention for household use, and as I am able to so select my ingredients of the various mixtures so as not to require heating to produce the proper coloring, the shrinking of garments so dyed is greatly lessened.

Thus I am able to combine any number of dyes to what appear to be true solutions that will always give the same uniform and satisfactory result in the dye-bath. In some instances I use as many as ten different dyestuffs to obtain the desired effect, and I would not be able to produce such stock solutions by using water, alcohol, or other solvents.

The solutions of dyes in glycerin which I prefer to produce generally range from 1 to 10%, depending on the shade or color desired. It is not possible to do this with either water or alcohol, as, in many of my combinations, either the one or the other dyestuff would not be completely soluble in either cold water or alcohol at the desired concentration, and therefore the dyeing effect would be entirely different.

But by first dissolving my dye mixtures in glycerin I have no difficulty in always producing solutions of the desired strength, and I have not yet found an acid, basic, or substantive dyestuff that I could not use for my solutions.

For instance, if, for the production of a tan color, I dissolve in glycerin 0.0016% rhodamine B extra (color index #749)
0.0880% rhodamine 6G extra (color index #752)
0.1080% methanil yellow (color index #138)
0.0520% direct brown (color index #606)
0.0960% direct fast scarlet (color index #326)
0.2704% direct green (color index #593)
1.1824% direct fast yellow (color index #622)
0.9200% chrysophenine (color index #365)
0.6400% naphthamine fast orange (color index #68)
0.6400% direct black (color index #581), and use a small amount of this solution to make up a dye-bath, I get an approximately 25 to 30% stronger dyeing effect on either silk or cotton, than I get when I dissolve the same amounts of dyes in an equal volume of water, and then take a corresponding amount of this water solution to make up my dye-bath.

It was also not to be foreseen that the acid, basic, and substantive dyes could be dissolved in glycerin in any combination. As has already been pointed out in a general way, it is not possible, for instance, to dissolve such mixtures of various classes of dyes promiscuously in water. The mixture of the acid and basic dyes, while they are individually soluble in water, will, when placed in solution together in water, precipitate each other partly or entirely from the water solution, thus rendering the mixture useless for satisfactory dyeing purposes. But I have no difficulty to combine such dyes in glycerin solution in sufficient concentration to serve the purpose of a stock presolution for use by the housewife for preparing extemporaneous dye-baths, owing to the properties of glycerin as previously described. It was to be feared that such combination, after dissolving in glycerin, would cause precipitation when the glycerin solution is added to water. I have found, however, that the various classes of dyes do not precipitate each other as they would if directly dissolved in water or other medium, but stay in solution, at any rate, for a sufficient length of time to permit their convenient use for the purposes stated. It is probable that we have here to do with a colloidal solution and that the dye mixtures remain in such solution at least sufficiently long to accomplish the desired dyeing effect.

As a specific illustration, I describe one form of such a presolution in glycerin of a mixture of several colors to produce a certain shade of green. It is, however, understood that my invention is not limited to the specific example here described for the purpose of illustration, as the principle herein disclosed is applicable to a wide range of the various classes of dye-stuffs and may be used for the production of a practically unlimited number of such combinations to give any desired colors or shades. I dissolve in glycerin, ½% diamine fast yellow G, (color index #16)
½% orange 2R, (color index #621)
½% orange Y, (color index #151)
½% malachite green, (color index #657).

If a teaspoonful of such a solution is added to one gallon of water, there is produced a deeply colored solution which produces a particularly pleasing and brilliant shade on silk, wool, or cotton, even though the dye-bath is not heated.

Of the foregoing four dyes the first two are substantive dyes, whereas the orange Y is an acid dye, and the malachite green a basic dye. When these are added directly to water without presolution in glycerin in the manner described, they will not, in combination, dissolve fully in water.

For this reason it is not possible to produce a similar 2% stock solution of the above dyes together in water, although the dyes are individually soluble in water.

I have found also that not even when the dye-stuffs are individually dissolved in proportional amounts of water and the proper proportions of each then added to a gallon of water, can there be obtained a dye-bath of similar quality as that produced by using my glycerin pre-solution for subsequently preparing the water dye-bath.

In practice I have found that it is not always necessary to use glycerin of full commercial strength, but that very often, for the sake of economy, small amounts of pure water may be added to the glycerin before dissolving the dyestuffs therein, and I find that this can be done without any detrimental effect on the keeping qualities of the solution, if the water is substantially free from mineral substances or other impurities.

It is to be understood, when I refer to glycerin, I refer generally to the commercial strengths of glycerin as found on the market which contain generally from 80–95% of anhydrous glycerin, but anhydrous glycerin can of course always be used in all cases.

It is obvious that many modifications may be made from the specific embodiments of my invention which are herein set forth by way of illustration only, and that numerous changes may be made in choice of colors and quantities according to the specific colors and shades desired, and otherwise, without departing from the spirit and scope of my invention.

What I claim as new and wish to cover by Letters Patent is:

1. A coloring composition comprising acid and basic coal-tar dyes in solution in glycerin.

2. A coloring composition comprising acid, basic, and substantive coal-tar dyes in solution in glycerin.

3. Coloring compositions comprising coal-tar dyes of diverse chemical types in solution in glycerin.

4. The process of preparing dye-baths from coal-tar dyes of divers chemical types by dissolving therein a mixture of such diverse dyes previously predissolved in glycerin.

5. A dye-bath comprising water in which has been dissolved a solution of coal-tar dyes of diverse chemical types in glycerin.

6. Coloring compositions comprising solutions in glycerin of diverse types of water-soluble coal-tar dyes which in the presence of each other are not fully soluble in water.

7. Coloring compositions comprising chemically incompatible coal-tar dyes in solution in glycerin.

8. The process of preparing dye-baths with chemically incompatible coal-tar dyes by dissolving therein a mixture comprising such dyes predissolved in glycerin.

9. An aqueous dye-bath in which has been dissolved a solution in glycerin of coal-tar dyes which are otherwise chemically incompatible when dissolved in water.

10. Coloring compositions comprising glycerin as a carrier and a plurality of coal-tar dyes of diverse chemical types, adapted for dyeing or tinting fabrics consisting of wool, cotton, or silk, or one or more of them, when added to a dye-bath.

11. The process of preparing dye-baths by dissolving therein a coloring composition of the kind substantially as described in claim 10.

12. An aqueous dye-bath comprising the water of the bath and a coloring composition of the kind substantially as described in claim 10.

13. Coloring compositions comprising glycerin as a carrier and a plurality of coal-tar dyes adapted for dyeing various kinds of fabrics, such as woolens, cottons, or silks, or a mixture of one or more of them, in aqueous dye-baths, one at least of such dyes being chemically incompatible with at least one other of such dyes when dissolved in water.

14. A stock presolution of diamine fast yellow G, orange 2R, orange Y, and malachite green in glycerin.

15. Dye-baths comprising a menstruum other than glycerin in which has been dissolved a glycerin presolution of coal-tar dyes of diverse chemical types, which are in themselves soluble in said menstruum, but some of which at least are chemically incompatible when directly dissolved in such menstruum.

EUGENE R. SCHLATTER.